US011958680B2

(12) United States Patent
Peterkin

(10) Patent No.: US 11,958,680 B2
(45) Date of Patent: *Apr. 16, 2024

(54) HEATED TAILGATE DEVICE

(71) Applicant: Ryan A Peterkin, Nikiski, AK (US)

(72) Inventor: Ryan A Peterkin, Nikiski, AK (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/170,206

(22) Filed: Feb. 16, 2023

(65) Prior Publication Data

US 2023/0192393 A1 Jun. 22, 2023

Related U.S. Application Data

(63) Continuation of application No. 17/838,508, filed on Jun. 13, 2022, now Pat. No. 11,884,482, which is a
(Continued)

(51) Int. Cl.
| | | |
|---|---|---|
| *B65D 88/74* | (2006.01) | |
| *B60P 3/22* | (2006.01) | |
| *B65D 81/20* | (2006.01) | |
| *B65D 88/02* | (2006.01) | |
| *B65D 88/12* | (2006.01) | |

(Continued)

(52) U.S. Cl.
CPC .......... *B65D 88/128* (2013.01); *B60P 3/2205* (2013.01); *B60P 3/226* (2013.01); *B60P 3/2295* (2013.01); *B65D 81/20* (2013.01); *B65D 88/022* (2013.01); *B65D 88/744* (2013.01); *B65D 88/748* (2013.01); *B65D 90/0033* (2013.01); *B65D 90/008* (2013.01);
(Continued)

(58) Field of Classification Search
CPC .. B65D 90/008; B65D 88/744; B65D 88/748; B60P 3/2205; B60P 3/226; B60P 3/2295
See application file for complete search history.

(56) References Cited

U.S. PATENT DOCUMENTS

| | | |
|---|---|---|
| 1,381,669 A | 6/1921 | Schreiber |
| 1,394,692 A | 10/1921 | Stocker |

(Continued)

FOREIGN PATENT DOCUMENTS

| | | | |
|---|---|---|---|
| CN | 210504155 U | * | 5/2020 |
| CN | 213541602 U | | 6/2021 |

(Continued)

OTHER PUBLICATIONS https://en.wikipedia.org/wiki/Vacuum_truck; Wikipedia Webpage Article "Vacuum Truck"; Last Edited Mar. 23, 2021; Received Aug. 2, 2021.

(Continued)

*Primary Examiner* — Hilary L Gutman
(74) *Attorney, Agent, or Firm* — Fargo Patent & Business Law; Thomas Kading

(57) ABSTRACT

This disclosure is directed toward a heated tailgate for use in cold climates. The heated tailgate may be used with a self-contained heated portable vacuum slurry box. The slurry box generally includes a vacuum tank, a structure attached to the tank, a vertical tailgate, and a hook for pulling the slurry box onto a vehicle. The heated tailgate provides that the slurry cuttings within the slurry box which are adjacent to the tailgate do not freeze and provides for a way in which the tailgate may seal to the vacuum box.

11 Claims, 14 Drawing Sheets

Related U.S. Application Data continuation of application No. 17/833,137, filed on Jun. 6, 2022, now Pat. No. 11,772,884, which is a continuation-in-part of application No. 17/579,792, filed on Jan. 20, 2022, now Pat. No. 11,396,419, which is a continuation-in-part of application No. 17/531,989, filed on Nov. 22, 2021, which is a continuation-in-part of application No. 17/396,403, filed on Aug. 6, 2021.

(51) Int. Cl.
*B65D 90/00* (2006.01)
*B65D 90/10* (2006.01)

(52) U.S. Cl.
CPC .......... *B65D 81/2015* (2013.01); *B65D 90/10* (2013.01); *B65D 2588/74* (2013.01)

(56) References Cited

U.S. PATENT DOCUMENTS

| | | | |
|---|---|---|---|
| 1,562,991 A * | 11/1925 | Rudigier | B65D 88/744 |
| | | | 105/247 |
| 1,866,544 A | 7/1932 | Cleaver | |
| 1,914,585 A | 6/1933 | Smith | |
| 2,145,614 A | 1/1939 | Stambaugh | |
| 2,558,648 A | 6/1951 | Gausmann | |
| 2,624,553 A | 1/1953 | Thompson | |
| 2,696,086 A | 12/1954 | Jones | |
| 3,228,466 A | 1/1966 | Carleton | |
| 3,255,517 A | 6/1966 | Barbera | |
| 3,359,971 A | 12/1967 | Snelling | |
| 3,372,693 A * | 3/1968 | Gutzeit | B65D 88/744 |
| | | | 165/41 |
| 3,595,307 A | 7/1971 | Mowalt-Larssen | |
| 3,638,443 A | 2/1972 | Maurer | |
| 3,685,458 A | 8/1972 | Price | |
| 3,766,586 A * | 10/1973 | Krickovich | E01H 1/0845 |
| | | | 15/83 |
| 3,866,340 A * | 2/1975 | Krickovich | E01H 5/098 |
| | | | 37/270 |
| 3,969,138 A | 7/1976 | Werth | |
| 4,136,463 A | 1/1979 | Nolan | |
| 4,155,586 A | 5/1979 | Flynn | |
| 4,414,462 A | 11/1983 | Price | |
| 4,476,788 A | 10/1984 | Loevinger | |
| 4,502,392 A * | 3/1985 | Rosenberger | F28D 1/0213 |
| | | | 165/172 |
| 4,515,189 A | 5/1985 | Mowatt-Larssen | |
| 4,530,288 A | 7/1985 | Loevinger | |
| 4,844,336 A | 7/1989 | Huber | |
| 4,882,912 A | 11/1989 | Fossey | |
| 4,940,256 A | 7/1990 | Jordan, III | |
| 5,133,041 A | 7/1992 | Richter | |
| 5,183,371 A | 2/1993 | O'Daniel | |
| 5,402,857 A | 4/1995 | Dietzen | |
| 5,419,400 A | 5/1995 | Wigington, Sr. | |
| 5,564,509 A | 10/1996 | Dietzen | |
| 6,179,070 B1 | 1/2001 | Dietzen | |
| 6,179,071 B1 | 1/2001 | Dietzen | |
| 6,345,509 B1 | 2/2002 | Garlov | |
| 6,345,672 B1 | 2/2002 | Dietzen | |
| 6,347,589 B1 * | 2/2002 | Loevinger | B61D 5/04 |
| | | | 280/837 |
| 7,172,378 B1 | 2/2007 | Cerullo | |
| 8,109,327 B2 | 2/2012 | Sulc | |
| 8,328,290 B2 | 12/2012 | Malatesta | |
| 8,485,132 B2 | 7/2013 | Kong | |
| 9,061,623 B2 | 6/2015 | MacLean | |
| 9,233,792 B2 | 1/2016 | Kooi | |
| 9,358,987 B2 | 6/2016 | Thomas | |
| 9,386,845 B2 | 7/2016 | Wu | |
| 9,482,460 B2 | 11/2016 | Laudet | |
| 9,821,953 B2 | 11/2017 | Sewell | |
| 10,221,602 B2 | 3/2019 | Sewell | |
| 10,556,601 B2 | 2/2020 | Hoffman | |
| 10,647,239 B2 | 5/2020 | Roberts | |
| 10,683,679 B2 | 6/2020 | Niemczewski | |
| 10,933,794 B1 | 3/2021 | Peterkin | |
| 11,396,419 B1 | 7/2022 | Peterkin | |
| 11,618,367 B2 | 4/2023 | Peterkin | |
| 2002/0195019 A1 | 12/2002 | Woodall | |
| 2005/0284948 A1 | 12/2005 | Robinson | |
| 2007/0000545 A1 | 1/2007 | Cannon | |
| 2007/0012680 A1 | 1/2007 | Grisoni | |
| 2007/0084801 A1 | 4/2007 | Norman | |
| 2007/0119628 A1 | 5/2007 | Reddoch, Sr. | |
| 2010/0224640 A1 | 9/2010 | Nothof | |
| 2011/0103901 A1 | 5/2011 | Hetcher | |
| 2011/0211818 A1 | 9/2011 | Grady | |
| 2012/0073675 A1 | 3/2012 | Dupuis | |
| 2012/0138630 A1 | 6/2012 | Kinsey, III | |
| 2014/0021114 A1 | 1/2014 | Ottney | |
| 2015/0143840 A1 | 5/2015 | Ma | |
| 2015/0274057 A1 * | 10/2015 | Hinde | B62D 33/08 |
| | | | 298/22 R |
| 2016/0265291 A1 * | 9/2016 | Powell, Jr. | C02F 1/048 |
| 2016/0376095 A1 | 12/2016 | Tanaka | |
| 2017/0081930 A1 | 3/2017 | McMillian | |
| 2017/0297814 A1 | 10/2017 | Goldstein | |
| 2018/0086245 A1 | 3/2018 | Heck | |
| 2018/0104622 A1 | 4/2018 | Dawson | |
| 2019/0263578 A1 | 8/2019 | Meydoun | |
| 2019/0316819 A1 | 10/2019 | Savenstrand | |
| 2020/0002157 A1 | 1/2020 | Eardley et al. | |
| 2021/0394663 A1 | 12/2021 | Meyer | |
| 2023/0043671 A1 | 2/2023 | Peterkin | |
| 2023/0173973 A1 | 6/2023 | Peterkin | |
| 2023/0192393 A1 | 6/2023 | Peterkin | |
| 2023/0242030 A1 | 8/2023 | Peterkin | |

FOREIGN PATENT DOCUMENTS

| | | |
|---|---|---|
| CN | 114278797 A | 4/2022 |
| EP | 381272 A | 8/1990 |
| GB | 489120 A | 7/1938 |
| GB | 627318 A | 8/1949 |
| GB | 2067522 A | 7/1981 |
| WO | 9113817 A | 9/1991 |
| WO | 0136296 A1 | 5/2001 |
| WO | 2013141707 A2 | 9/2013 |
| WO | 2013187997 A1 | 12/2013 |
| WO | 2014137230 A2 | 9/2014 |
| WO | 2015069564 A1 | 5/2015 |

OTHER PUBLICATIONS https://dragonproductsltd.com/roll-off-equipment-2/vacuum-box/; Dragon Products, LTD Vacuum Box Webpage; Received Aug. 2, 2021.

https://toico.com/heated-collar/; Toico Industries; Heated Collar (Year: 2022).

https://toico.com/heated-brass-lever-valve/; Toico Industries; Heated Brass Lever Valve (Year: 2022).

http://www.glossary.oilfield.slb.com/en/Terms/s/skid/aspx; Schlumberger Oilfield Glossary entry for "skid" as it appeared in 2013.

\* cited by examiner

HEATED TAILGATE DEVICE

CROSS REFERENCE TO RELATED APPLICATIONS

This application claims the priority as a continuation of U.S. Nonprovisional patent application Ser. No. 17/838,508, filed Jun. 13, 2022, which is a continuation-in-part of U.S. Nonprovisional patent application Ser. No. 17/833,137, filed Jun. 6, 2022, which is a continuation-in-part of U.S. Nonprovisional patent application Ser. No. 17/579,792, filed Jan. 20, 2022, which issued as U.S. Pat. No. 11,396,419 on Jul. 26, 2022 and is a continuation-in-part of U.S. Nonprovisional patent application Ser. No. 17/531,989, filed Nov. 22, 2021, which is a continuation-in-part of U.S. Nonprovisional patent application Ser. No. 17/396,403, filed Aug. 6, 2021. Each of the aforementioned patent applications, and any applications related thereto, are herein incorporated by reference in their entirety.

FIELD OF TECHNOLOGY

This disclosure relates generally to technology for roll-off self-contained cutting boxes for heated slurry transport, receiving, and dumping in cold climates with freezing temperatures.

BACKGROUND

Drill cuttings are produced during drilling of oil wells and gas wells. The drill cuttings are carried to the surface by a drilling fluid circulating up from the drill bit. The drill cuttings are separated from the drilling fluid so the recycled drilling fluid may be reused during the drilling process. The separated drill cuttings along with a portion of the drilling fluid and other fluids form a cuttings slurry that is often transported to a vacuum tank for holding until full. Once the tank is full of the cuttings slurry, the slurry cuttings is transported to a disposal facility.

One problem with conventionally transporting slurry cuttings in a vacuum tank is that the slurry cuttings may freeze in cold weather environments such as Alaska, cold climate states and Canada, making it difficult to unload the slurry cuttings from the vacuum box. To solve this problem one solution is to provide heat energy to keep the slurry cuttings from freezing. Slurry cuttings that are transported in a vacuum tank are commonly dumped from a vacuum tank by opening a tailgate attached to the vacuum tank. Repetitively opening the tailgate opening may dimmish the ability for the tailgate to seal to the vacuum tank. If the tailgate is not heated slurry cuttings may freeze adjacent to the tailgate. Further, if the manner in which the tailgate seals to the vacuum tank is not configured for cold weather operations, the ability to seal may diminish.

Vacuum tanks must be removed from oil and gas well sites in a timely manner such to not impede the function of a drilling rig at an oil or gas well site. Such sites are limited in space and storing many vacuum tanks on the oil or gas well site is not possible with current vacuum tank systems. Further portable slurry boxes often do not fit the requirements to be efficiently emptied at disposal facilities. In the warm summer months, poor road conditions cause excess wear on equipment. Transporting vacuum tanks with heating functions over summer roads during times of the year when the heating functions are unneeded unnecessarily causes wear on such equipment.

SUMMARY

This disclosure is directed toward a heated tailgate device. The heated tailgate may be attached to a self-contained heated portable vacuum slurry box. The slurry box may be such that it can be placed on a vehicle for transportation or moved at a particular location. An example of a vehicle that can be used with the slurry box is a traditionally understood roll-off truck. In such embodiment, the slurry box can be loaded or unloaded from a roll-off truck. The slurry box is constructed with a vacuum tank such that it can hold vacuum when a vacuum pump is fluidly attached to the tank. The vacuum can cause material such as slurry cuttings to be pulled into the vacuum tank. The vacuum tank may also be constructed such that it can maintain a positive pressure such that material may be forced from the vacuum box.

One embodiment of the invention as disclosed herein is directed to a heated tailgate attached slurry box. The slurry box may be used in cold climates such as northern Alaska or other geographic locations which sustain extremely low temperatures. Temperatures may hover well below zero degrees and may maintain temperatures of −50 degrees Celsius. Steel may be adversely affected by low temperatures. For example, the tensile toughness may be affected, and safe working capacities may be reduced.

The heated tailgate is comprised of a tailgate assembly, an interior surface, a tailgate warming tube loop, and a first rear flange. The tailgate may be comprised of a tailgate assembly and a tailgate warming tube loop. The tailgate assembly may be comprised of structural members and an interior surface. The structural members may be metal square tubing attached together to create the shape of the tailgate. Structural members may be fastened together with fasteners, welded, or other devices. The interior surface is attached to the structural members.

The slurry box may comprise a vacuum tank, a structure attached to the tank, a mechanical bay, a tailgate, and a hook for pulling the slurry box onto a vehicle. An alternative vertical tailgate allows for the slurry box to be unloaded in a compact space which does not allow for a traditional swing door that takes additional lateral room. Multiple slurry boxes may be stacked to conserve room on a well site. To adapt the slurry box for stacking, a stacking mount system and a stacking leg system may be attached to the structure.

BRIEF DESCRIPTION OF THE DRAWINGS

These and other features and advantages of the present invention will become more readily appreciated as the same becomes better understood by reference to the following detailed description when considered in connection with accompanying drawings, wherein.

DETAILED DESCRIPTION OF THE ILLUSTRATED EMBODIMENTS

General

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

Figures Detail

The slurry box as described in U.S. Nonprovisional Patent Application Ser. No. 17/531,989, filed Nov. 22, 2021, U.S. Nonprovisional patent application Ser. No. 17/396,403, filed Aug. 6, 2021, and the vacuum box as defined in U.S. Pat. No. 10,933,794 to Peterkin titled "Heated slurry transport system", all contents of which are hereby incorporated by reference in its entirety and define the slurry box 101 as referenced in herein.

Figure 1:
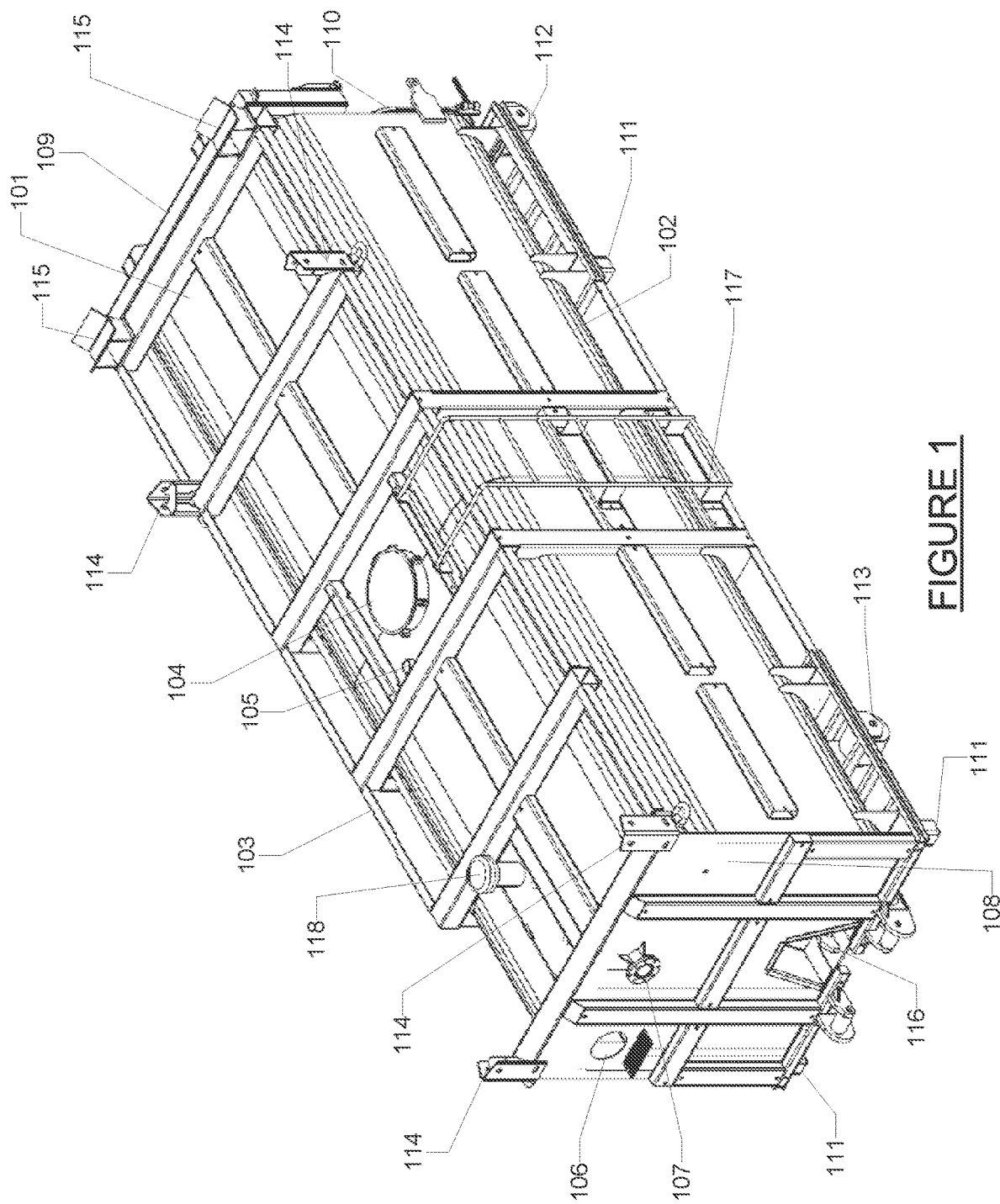
FIG. 1 is a simplified block diagram showing the method in which a slurry box is used efficiently.

FIG. 1 is a perspective view of an exemplary slurry box 101. The slurry box 101 is comprised of a vacuum tank 102, a structure 103, and a mechanical bay 106. The slurry box 101 has a front 108 and a rear 109. The vacuum tank 102 is attached to the structure 103. Attached to the vacuum tank 102 is a manhole 104 which can be opened to allow for a person to enter the vacuum tank 102 or to load or unload the vacuum tank 102. The vacuum tank 102 may be configured such that it can withstand full or partial vacuum pressure. When the vacuum tank 102 is placed under a vacuum from an external vacuum pump, material may be drawn into the vacuum tank 102. Mounted on the vacuum tank 102 may be a thermo relief valve 105. Fluidly attached to the vacuum tank 102 may be one or more openings for loading and unloading. Each opening may be closed to fluidly seal the vacuum tank 102. In this exemplary vacuum tank 102, a front pipe flange 107 is shown.

The front pipe flange 107 can be used either for loading or unloading depending on requirements dictated by the worksite at which the slurry box 101 is located. A vacuum pump may be fluidly attached to the front pipe flange 107 or any other pipe flange on the slurry box 101. The extent of the vacuum to be applied within the vacuum tank 102 may range all the way from relative atmospheric pressure to a full vacuum depending on the application at a worksite. In the event the front pipe flange 107 is not being utilized at a job site, the front pipe flange 107 may be covered or may be connected to a valve which seals the opening. Any opening on the vacuum tank 102, including the front pipe flange 107, may be jacketed with an exterior surface to allow a heat fluid flow to be circulated around an inner surface. For example, the front pipe flange 107 may have a five inch inner surface and a six inch exterior surface. Material may be loaded or unloaded through the five inch inner surface of the pipe flange in the vacuum tank 102.

At the rear of the slurry box 101 a tailgate 110 can be attached. FIG. 1 is displayed without a tailgate 110 attached. The tailgate 110 is attached to hinges on the slurry box 101 which allow for the tailgate 110 to be mechanically opened vertically. By attaching the tailgate 110 on the slurry box 101 such that it is vertically opened ensures that the slurry box 101 does not need additional lateral space to either side. In many applications the slurry box 101 needs to be unloaded at sites which do not allow for excess lateral space around the slurry box 101. When closed the tailgate 110 is sealed to the vacuum tank 102 such that the vacuum tank 102 may maintain vacuum pressure.

The structure 103 of the slurry box 101 is attached to the vacuum tank 102. A ladder may be attached to the slurry box 101 to allow for access to the manhole 104 at the top of the slurry box 101. The structure 103 allows for the slurry box 101 to be lifted, moved, or transported. At the bottom of the slurry box 101 a rear wheel set 112 may be attached to the structure 103 near the rear 109. The rear wheel set 112 is as commonly appreciated for use in roll-off containers. In the exemplary embodiment shown in FIG. 1 an optional front wheel set 113 is shown. The rear wheel set 112 and the optional front wheel set 113 as included in some embodiments comprise a base wheel set.

The slurry box 101 may be stacked vertically when more than one slurry box 101 is used. Many gas or oil well sites have limited space on which equipment can be placed and the ability to stack the slurry box 101 is a valuable function. To enable the stacking function, attached to the structure 103 is at least one stacking leg 111 and at least one stacking mount 114. In the exemplary embodiment shown in FIG. 1 four stacking mounts and four stacking legs are demonstrated. A wheel platform 115 may be attached to the structure 103 to support a wheel set when a slurry box 101 is stacked. In the embodiment shown, a set of rear wheel platforms are demonstrated in a position that would support the rear wheel set 112 when stacked. The slurry box 101 my be lifted using d-rings and chains, a forklift, or any other lifting mechanism. When stacked each respective stacking leg 111 fits into each respective stacking mount 114. The one or more stacking mounts collectively comprise a stacking mount system. The one or more stacking legs comprise a stacking leg system. The stacking leg systems fits together with the stacking mount system.

In the embodiment shown in FIG. 1 the slurry box 101 is shown to be similar to a roll-off container. A roll-off container is a portable container which may be transported on a vehicle. In the figure, the slurry box 101 is shown similar to a cable type roll-off container. A cable roll-off container may be pulled or placed on a vehicle such as a tilt-bed vehicle including a truck or trailer by a winch. A cable attached to the winch may be attached to a hook point 116 on the structure 103. The slurry box 101 may be then pulled onto the vehicle. In an alternative embodiment the structure 103 may be built to allow for the hook point 116 to be attached near the top of the structure 103 to allow for a hook-loader type vehicle to pull the slurry box 101 onto the vehicle. For the purpose of this disclosure, a roll-off vehicle is considered to be either a tilt-bed vehicle, a truck trailer combination, or a hook-loader type vehicle. A truck trailer combination type vehicle is a vehicle 201 where a truck pulls a trailer, the trailer which is a hook-loader type trailer or a tilt-bed type trailer. In a truck trailer combination the slurry box 101 is pulled onto the trailer section of the truck trailer combination just as a slurry box 101 is pulled onto a tilt-bed vehicle or a hook-loader type vehicle.

The slurry box 101 is sized to fit onto a vehicle. The slurry box 101 may be built in a variety of sizes and shapes to accommodate for different vehicles. An exemplary slurry box 101 may be 2.26 meters (89 inches) wide by 7.37 meters (290 inches) long. A slurry box 101 with such dimensions would be compliant with certain various jurisdictional transportation requirements.

A mechanical bay 106 is located within the slurry box 101. The mechanical bay 106 may be located constructed as an element of the structure 103. An element of the structure means the mechanical bay 106 is attached within the structure 103. In the mechanical bay 106 certain ancillary equipment is located. A power unit 801 for providing heat energy to fluid within warming tubes and jacketed openings may be located in the mechanical bay 106. The power unit may also provide energy to power a hydraulic pump 805 to produce flow and pressure to operate various hydraulic functions. Such hydraulic functions include but are not limited to hydraulically opening the tailgate 110. The power unit 801 may be a diesel engine with a fuel tank, an electric motor with a battery bank, or any other method as appreciated by one with ordinary skill in the art. The mechanical bay 106 is designed to allow for the power unit 801 to be disconnected and removed when not needed. An exhaust port 118 may be positioned to allow for gas and air to circulate out of the mechanical bay 106.

The power unit is adapted to provide heat energy to fluid within warming tubes and jacketed openings. The warming tubes and jacketed openings contain a heating fluid which is provided heat from the power unit by the use of a heat exchanger or other method understood by a person with ordinary skill in the art. The heating fluid within is circulated through the warming tubes and jacketed openings for the purpose of distributing the heat energy. The heating fluid being circulated is a heated fluid flow.

The thermo relief valve 105 is such that if the pressure within the vacuum tank 102 increases, the pressure can be safely emitted from the tank. The thermo relief valve 105 ensures that the vacuum tank 102 does not become under a positive pressure.

The slurry box 101 may be constructed of rigid materials, such as steel or aluminum. The structure 103 materials must be of requisite strength to allow for the slurry box 101 to be lifted, transported, and the vacuum tank 102 filed with materials. The vacuum tank 102 must be constructed in materials capable of withstanding negative pressure up to a full vacuum.

The invention as disclosed herein is directed to an embodiment of the slurry box 101 that is constructed in a novel manner that utilizes certain types of materials for certain purposes. The slurry box 101 may be used in cold climates such as northern Alaska or other geographic locations which sustain extremely low temperatures. Cold regions may be referenced herein as the "artic". Temperatures may hover well below zero degrees and may maintain temperatures of −50 degrees Celsius. Steel may be adversely affected by low temperatures. For example, the tensile toughness may be affected, and safe working capacities may be reduced.

Part or all of the slurry box 101 may be constructed from certain types of heat-treated steels that undergo alloying. Alloying may include carbon, manganese, silicon, and other components. The invention as disclosed herein is specific to the selection of steel of which the slurry box 101 comprises.

The slurry box 101 may be constructed from a steel such as ASTM A537 Grade B. Traditionally most welded pressure vessels, storage tanks, and transportation equipment has been constructed from steels such as ASTM A516 and A442. A516 is a common carbon steel used. A516 may show signs of fatigue in artic conditions. A516 is generally rated with a lowest usual service temperature of −45 degrees Celsius.

Many steels exhibit ductile fracture at elevated temperatures and a brittle fracture at low temperatures. A ductile fracture is a type of fracture that is characterized by plastic deformation and necking. The plastic deformation and necking typically occurs prior to actual fracture. A brittle fracture is a type of fracture that is characterized by an actual fracture that is not proceeded by appreciable plastic deformation. Typically for steels, a lesser impact energy is required to cause a brittle fracture relative to a ductile fracture. Further, as a ductile fracture occurs, impact energy is absorbed by the steel undergoing deformation, whereas with a brittle fracture the steel actually fractures without appreciable plastic deformation such that impact energy is not absorbed while the steel deforms.

The temperature at which a steel transitions from a ductile fracture to a brittle fracture is known as the ductile-brittle transition. The ductile brittle transition is a temperature at which the impact energy needed to cause an actual fracture passes below a predetermined value. A test understood by persons in the industry is the Charpy impact test. The Charpy impact test establishes the predetermined value to be 40 Joule.

Charpy impact test is sometimes referred to as the Charpy V-notch test in the steel industry. The Charpy impact test is a standardized high strain-rate test that involves striking a specimen with a value of impact energy.

Some grades of A516 may have a ductile brittle transition of around −30 degrees Celsius. Some grades of A537 may have a ductile brittle transition less than the artic temperatures of −50 degrees Celsius. A537 in some grades is rated for a lowest usual service temperature of −60 degrees Celsius. By selecting a steel that has a ductile brittle transition less than the artic temperatures, the steel is more suitable for use in the artic. Steel, such as A516, may effectively shatter in a brittle failure in extremely cold temperatures which are beneath the ductile brittle transition temperature.

Traditionally, roll-off containers have not been constructed from steels with a ductile brittle transition temperature less than −30 degrees Celsius. Typically, roll-off containers have been long constructed out of steels similar to A516. Vacuum trucks are a type of truck that is generally comprised of a vacuum tank and a vacuum pump which are permanently mounted to a truck frame. Vacuum trucks have traditionally been used to remove slurry cuttings from oil rig sites. Vacuum trucks traditionally have not been constructed from steels with a ductile brittle transition temperature less than −30 degrees Celsius. Typically, vacuum trucks have been long constructed out of steels similar to A516.

Steels with a ductile brittle transition less than −30 degrees Celsius have been used to some extent for stationary tanks in the artic. Identifying the specific characteristics of a suitable steel including the ductile brittle transition temperature is highly technical as there are many variations of steels. The selection of A537 Grade B is based on ductile brittle transition temperature, strength of material, fatigue limits, and workability for construction. A537 may be a difficult steel to use for equipment construction and specialized welding and manufacturing techniques may be required. More traditional steels such as A516 are less expensive than steels like A537. Given this cost constraint, those in the industry have been motivated to use less costly steels like A516.

Many different steels are engineered specifically for service at low temperature (about −100° C.), selecting the optimum material calls for thorough understanding of the application and knowledge of the mechanical properties that each grade provides. It isn't as simple as to simply choose a steel type based simply on temperature.

An additional consideration when selecting a suitable type of steel for application on the slurry box 101 is fatigue limits. At low temperatures, systems are usually subjected to dynamic loads, and structural members to cycle stresses. Examples include the vacuum tank 102 that frequently undergo pressure changes and mobile equipment that experience extreme stress imposed by packed snow or high winds. Other considerations include heat conductivity and thermal expansion.

The slurry box 101 may be constructed such that the vacuum tank 102 may hold a positive pressure. A positive pressure is a pressure within the vacuum tank 102 that is greater than the atmospheric surrounding the vacuum tank 102. A vacuum pressure is a pressure within the vacuum tank 102 that is less than the atmospheric surrounding the vacuum tank 102. A tank that is capable of holding a positive pressure may be referenced as a pressure vessel. The vacuum tank 102, when constructed to hold a positive pressure, in this application, may be called a pressure vessel.

In order to construct the slurry box 101 such to be capable of holding a positive pressure, the thermo relief valve 105 will be removed from such embodiment. The thermo relief valve 105 may be replaced with a pressure relief valve. A pressure relief valve is a valve that releases excess pressure. A pressure relief valve may be a safety mechanism to limit the pressure in the vacuum tank 102. A pressure relief valve can be set to release pressure ranging anywhere from just over the pressure surrounding the vacuum tank 102 to pressures exceeding 275.8 kPa (40 psig). Each opening in the vacuum tank 102 would need to be constructed such to be able to hold a positive pressure.

Construction may be such that the vacuum tank 102 may hold the desired level of positive pressure. For example, an operator may desire the vacuum tank 102 to hold a positive pressure of 206.8 kPa (30 psig). When the openings are sealed, the openings and the vacuum tank must hold the desired positive pressure when configured to hold a positive pressure. If used, the pressure relief valve must be configured to allow for a greater pressure than the desired pressure.

Exemplary standards which may be followed in constructing the vacuum tank 102 for positive pressure include what is commonly referenced as a DOT 407 or 412 cargo tank. A DOT 407 cargo tank is described in detail in 49 CFR § 178.347. A DOT 412 cargo tank is described in detail in 49 CFR § 178.348.

When configured as a pressure vessel, slurry cuttings held in the vacuum tank 102 may be forced out of the vacuum tank 102 using positive pressure. Slurry cuttings may be forced from the vacuum tank 102 using pressure when the slurry cuttings contain enough water to be cable of flowing. However, suppose the slurry cuttings are solid or do not contain enough water. In that case, positive pressure may not be sufficient to force the solid slurry cuttings out of the vacuum tank 102 through openings. Unloading the slurry cuttings may be completed using positive pressure if the slurry cuttings are capable of flowing out of an opening.

Figure 2:
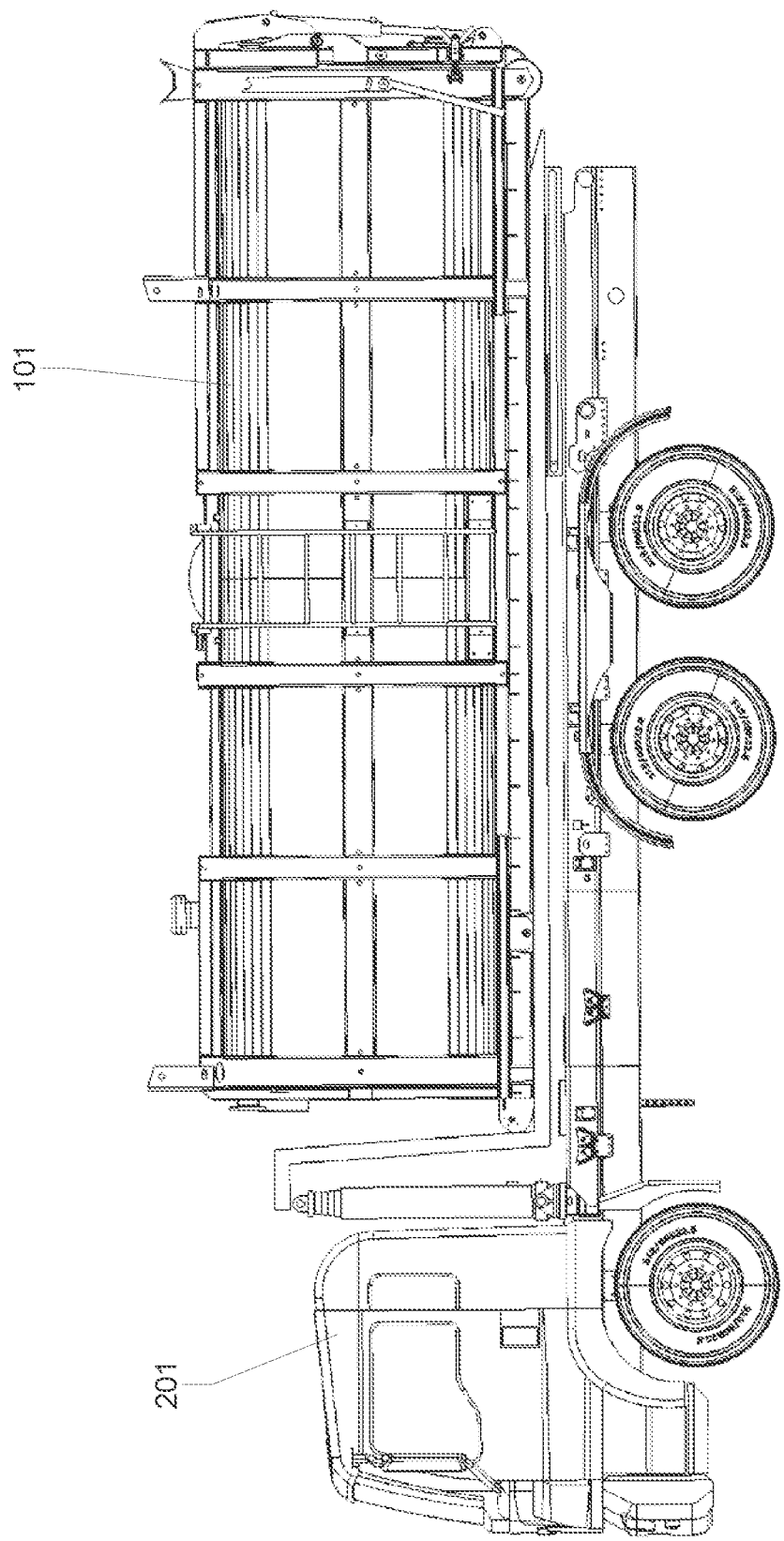
FIG. 2 is a 2D perspective of an exemplary slurry box mounted on a vehicle.

FIG. 2 is a perspective view of an exemplary slurry box 101 mounted on a vehicle 201. The vehicle 201 in this exemplary figure is a tilt-bed roll-off type vehicle. The exemplary slurry box 101 is shown as a cable type roll-off embodiment. Other types of vehicles and roll-off embodiments may be used as commonly appreciated by a person of ordinary skill in the art. The vehicle 201 configured as a tilt-bed roll-off type vehicle is capable of pulling the slurry box 101 onto the vehicle 201 and capable of causing the slurry box 101 to be displaced from the vehicle 201. The vehicle may cause a slurry box 101 to be displaced from the vehicle 201 and then pull a different slurry box 101 onto the vehicle 201. A well site may have multiple slurry boxes placed on site.

Figure 3:
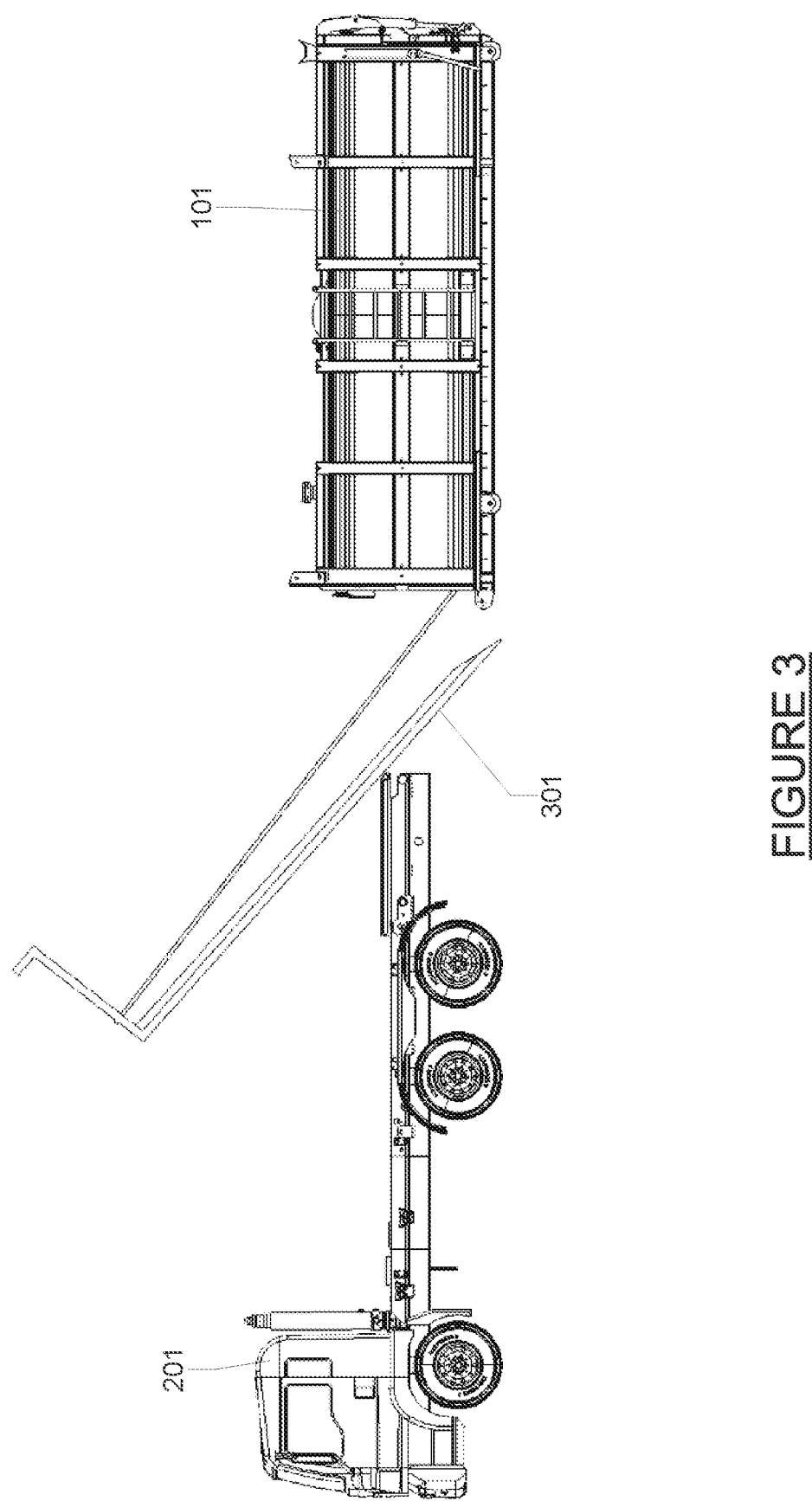
FIG. 3 is a perspective view of an exemplary slurry box connected at an oil rig.

FIG. 3 is a perspective view of an exemplary slurry box 101 displaced from a vehicle 201. The vehicle 201 in the exemplary figure shows a tilt-bed roll-off type vehicle. The vehicle 201 is shown with a tilt-bed 301 and a cable 302. The cable 302 can be used to pull the slurry box 101 onto the tilt-bed 301.

Figure 4:
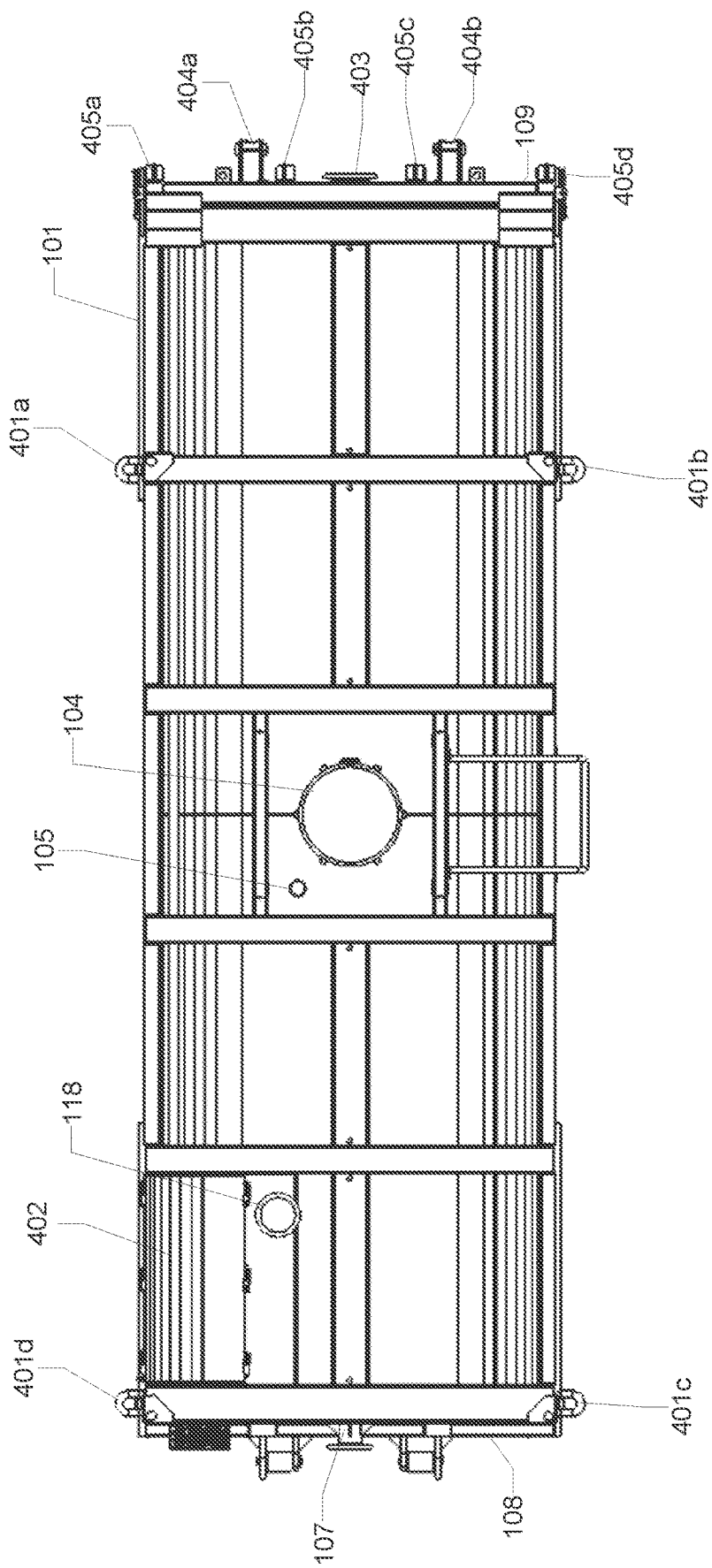
FIG. 4 is a perspective view of two slurry boxes stacked on top of each other.

FIG. 4 is a 2D view of the top of an exemplary slurry box 101. Shown on the top of the slurry box 101 is the manhole 104, the thermo relief valve 105, the exhaust port 118, as well as other slurry box 101 features. In this exemplary figure, a set of lift hooks 401 are shown attached to the structure 103. The lift hooks 401 are positioned to allow for the slurry box 101 to be picked up. Near the front 108 of the slurry box 101 the mechanical bay 106 is shown. Access to the mechanical bay 106 may be had via a bay cover 402. At the front 108 of the slurry box 101 a front pipe flange 107 can be seen. At the rear 109 of the slurry box 101 a rear pipe flange 403 can be seen. Like the front pipe flange 107, the rear pipe flange 403 may be jacketed to allow for a heated fluid flow to be circulated around the inner surface such to keep the material within the vacuum tank 102 and within the jacketed flange from freezing.

At the rear 109 of the slurry box 101 a hydraulic mount 404a is shown. An additional hydraulic mount 404b is shown. Each hydraulic mount 404 is where a hydraulic cylinder may be connected. The hydraulic cylinder may be connected on the opposite end to the tailgate 110. When hydraulic pressure is delivered to the hydraulic cylinder, the tailgate 110 may be opened or closed by the retracting or extending of the hydraulic cylinder. The tailgate 110 is attached to the slurry box 101 with at least one tailgate hinge 405. In the exemplary FIG. 4 four hinges are shown.

Figure 5:
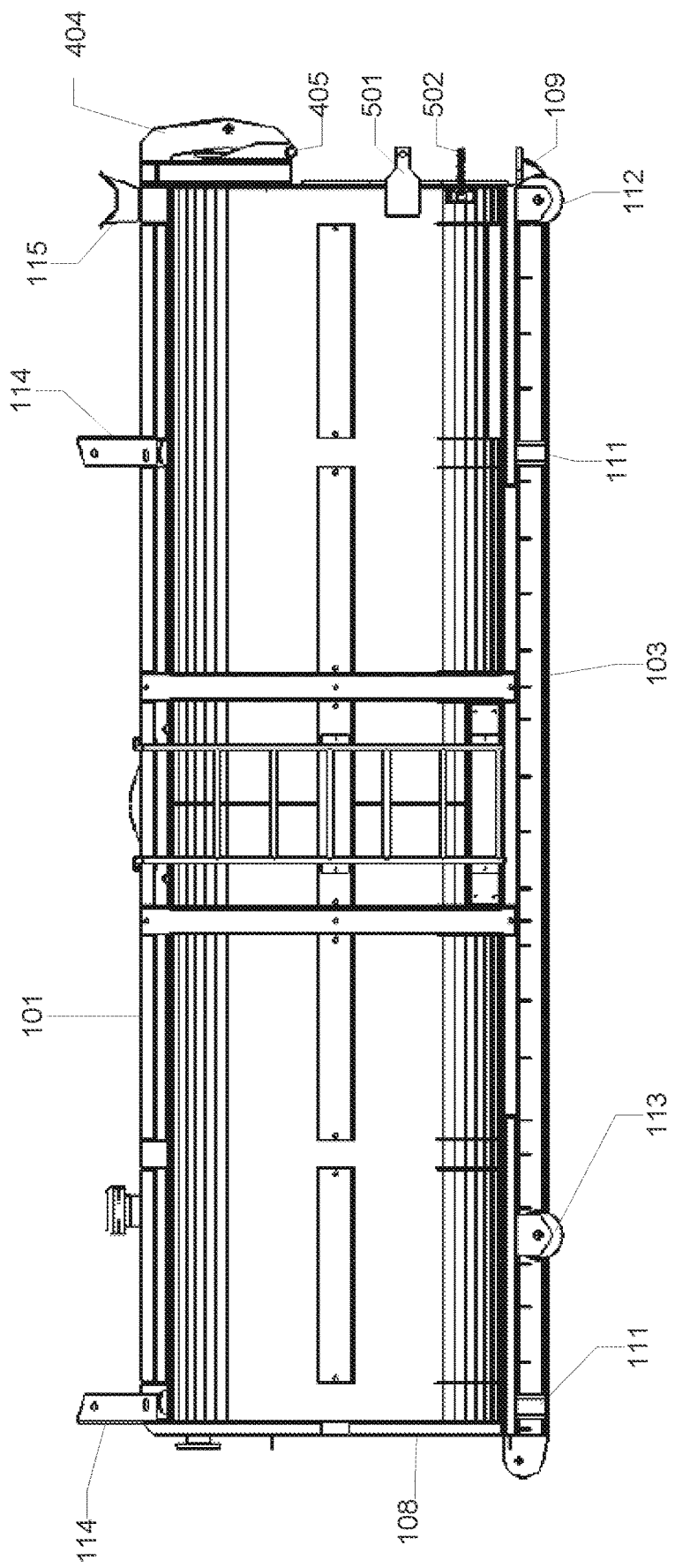
FIG. 5 is a simplified block diagram showing the method in which a slurry box is unloaded.

FIG. 5 is a 2D view of the driver-side perspective of an exemplary slurry box 101. Shown attached to the structure 103 is the front wheel set 113 and a rear wheel set 112. A stacking leg 111 is attached near the front 108 of the slurry box 101 and near the rear 109. A stacking mount 114 is attached near the front 108 of the slurry box 101 and near the rear 109. A rear wheel platform 115 is shown near the rear 109 of the slurry box 101.

At the rear 109 of the slurry box 101, a hydraulic mount 404 is shown. In FIG. 5 the tailgate 110 and hydraulic cylinders are removed from the drawing. At least one tailgate hinge 405 is shown. A latch receiver 501 is attached to the vacuum tank 102. The latch receiver 501 interfaces with the tailgate 110 such that when the tailgate 110 is in the closed position, a hydraulic latch mounted on the tailgate 110 secures into the latch receiver 501. When the hydraulic latch is secured into the latch receiver 501, the tailgate 110 may not be moved from the closed position. The closed position is when the tailgate 110 is secured to the vacuum tank 102 and a fluid seal is made between the vacuum tank 102 and the tailgate 110. A manual latch 502 is attached to the vacuum tank 102. The manual latch 502 in this exemplary embodiment comprises a threaded bolt and a wingnut secured on the threaded bolt when the tailgate 110 is in the closed position. The wingnut in the example, is to be removed by an operator.

Figure 6:
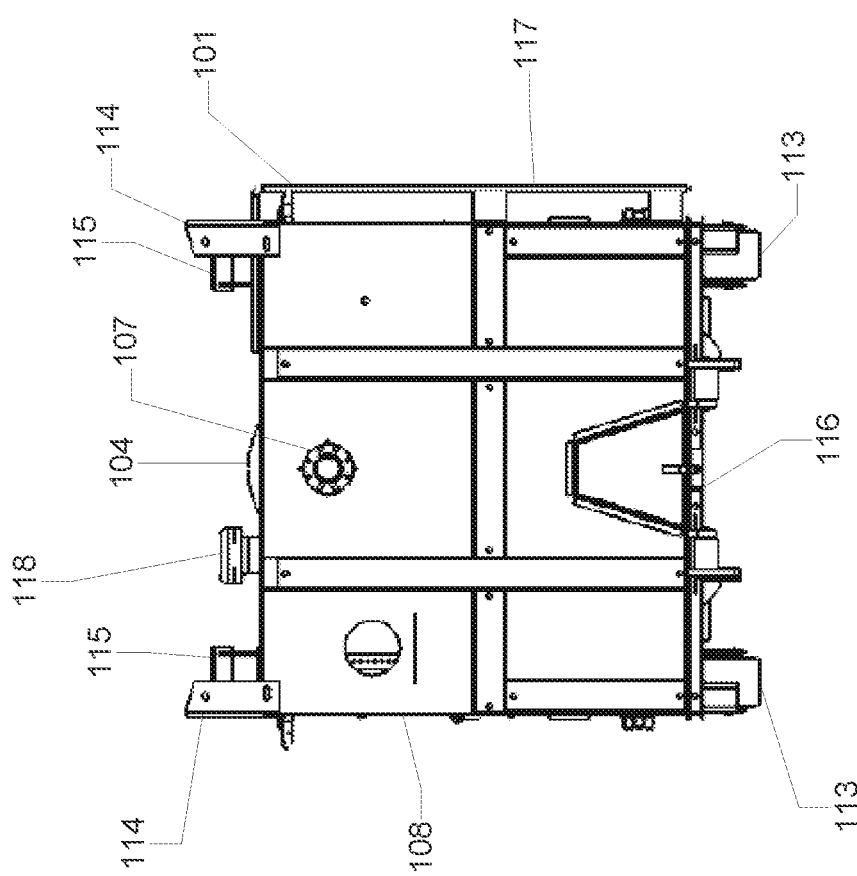
FIG. 6 is a 2D perspective of an exemplary slurry box in a raised position.

FIG. 6 is a 2D view of the front 108 of an exemplary slurry box 101. Shown in the figure is the front pipe flange 107 near the top of the slurry box 101. Mounted near the top of the slurry box 101 is a least one stacking mount 114. In the figure, two stacking mounts are displayed. At the bottom of the slurry box 101 at least one front wheel set 113 is shown. In the exemplary figure, two wheels are shown. A hook point 116 is shown in the figure. Shown in the figure is a partial view of a set of rear wheel platforms, a partial view of the manhole 104, and the exhaust port 118. On the side of the slurry box 101 can be seen a side profile of the ladder 117.

Figure 7:
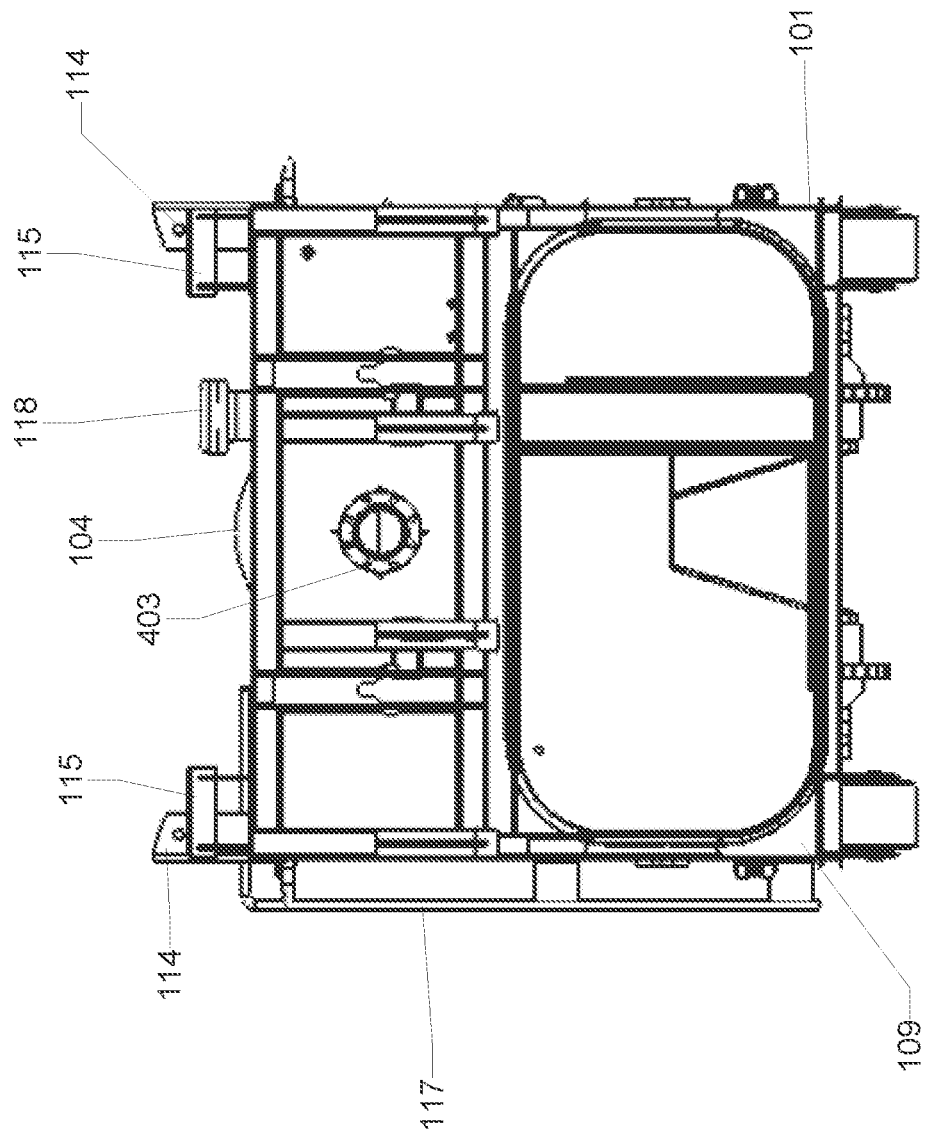
FIG. 7 is a 2D perspective of an exemplary slurry box and vehicle.

FIG. 7 is a 2D view of the rear 109 of an exemplary slurry box 101. Attached to the slurry box 101 is at least one rear wheel platform 115. Shown in the figure is two rear wheel platforms. Alternatively, the slurry box 101 may be configured without any rear wheel platforms. At least one stacking mount 114 is attached to the slurry box 101. In the figure two stacking mounts are displayed. On the side of the slurry box 101 can be seen a side profile of the ladder 117. The manhole 104 and the exhaust port 118 may be located at the top of the slurry box. The manhole 104, the ladder 117, and the exhaust port 118 are not essential in all embodiments of the invention disclosed in this description. An optional rear pipe flange 403 is shown.

Figure 8:
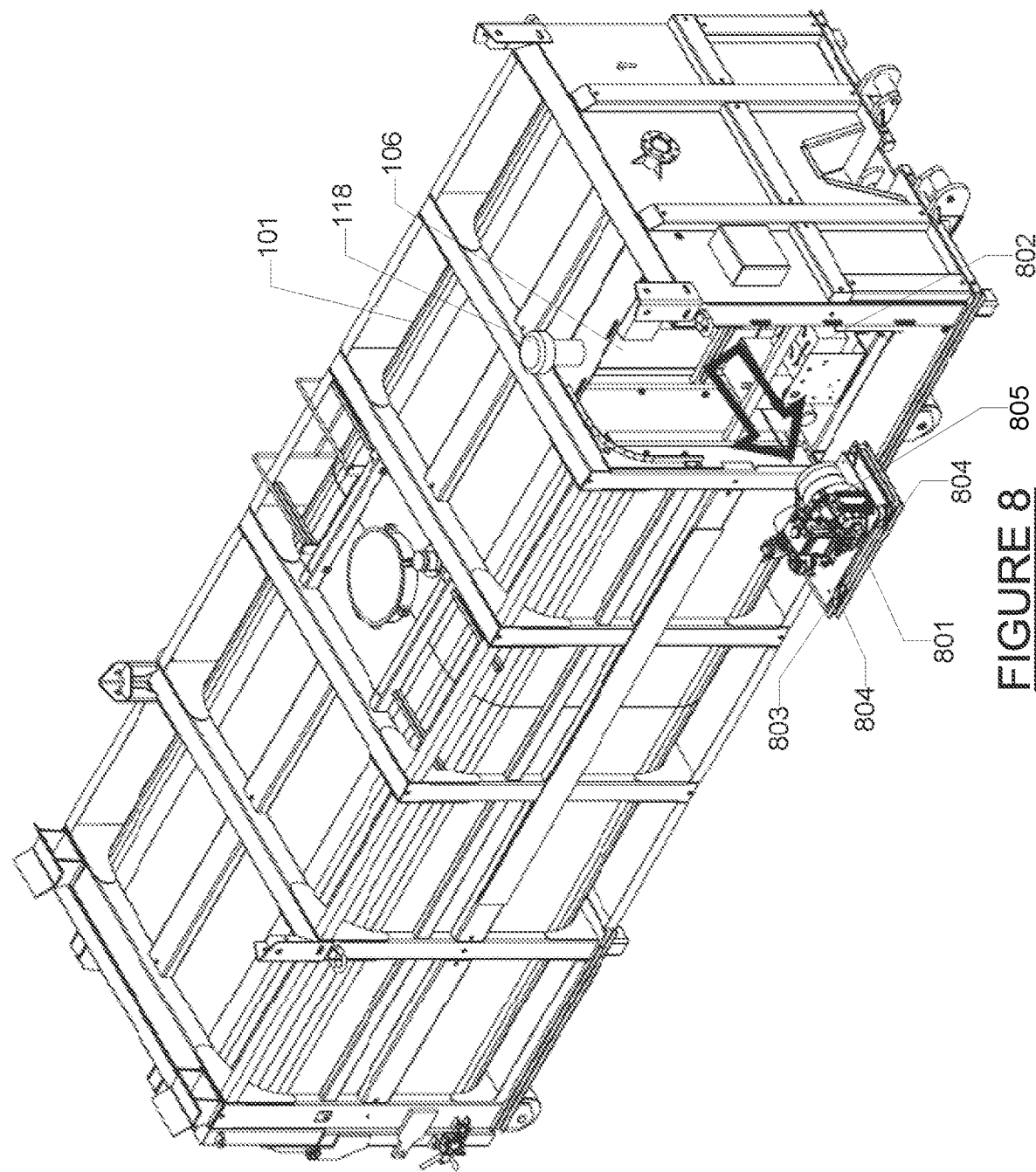
FIG. 8 is a perspective view of an exemplary slurry box.

FIG. 8 is a perspective view of a slurry box 101 and shows how the power unit 801 can be removed. The slurry box 101 is shown with a bay cover 402 opened such to allow access to the mechanical bay 106. The exhaust port 118 allows for exhaust to be vented from the mechanical bay 106. In the exemplary figure a diesel engine is shown as the power unit 801. The power unit 801 is connected to a hydraulic pump 805 to produce hydraulic pressure, connected to a pump to provide a fluid flow through the warming tubes, and configured to provide heat energy to the fluid within the warming tubes. The diesel engine may be substituted with an alternative power unit device. Such alternatives include but are not limited to an electric motor, a gasoline engine, a turbine, or any other such device appreciated by one with ordinary skill in the art. The power unit 801 uses an energy source 802 attached to the slurry box 101. The energy source 802 may be electrical energy, chemical energy, gasoline, diesel, or other such energy source 802 which is compliant with the relevant power unit 801.

The power unit 801 may be configured on a skid 803 which allows for the power unit 801 to be removed from the mechanical bay 106. The skid 803 may be configured with one or more forklift pockets 804 to allow for the skid 803 and items to which it is attached to be removed from the mechanical bay 106 using a forklift. In alternative embodiments, the hydraulic pump 805 and/or other components may be attached to the skid 803 to allow for removal from the mechanical bay 106. Any type of quick disconnect connectors understood by a person of ordinary skill in the art may be used to connect the skid 803 and items to which it is attached to warming tubes, hydraulic lines, electrical connections, and other elements on the slurry box 101.

Figure 9:
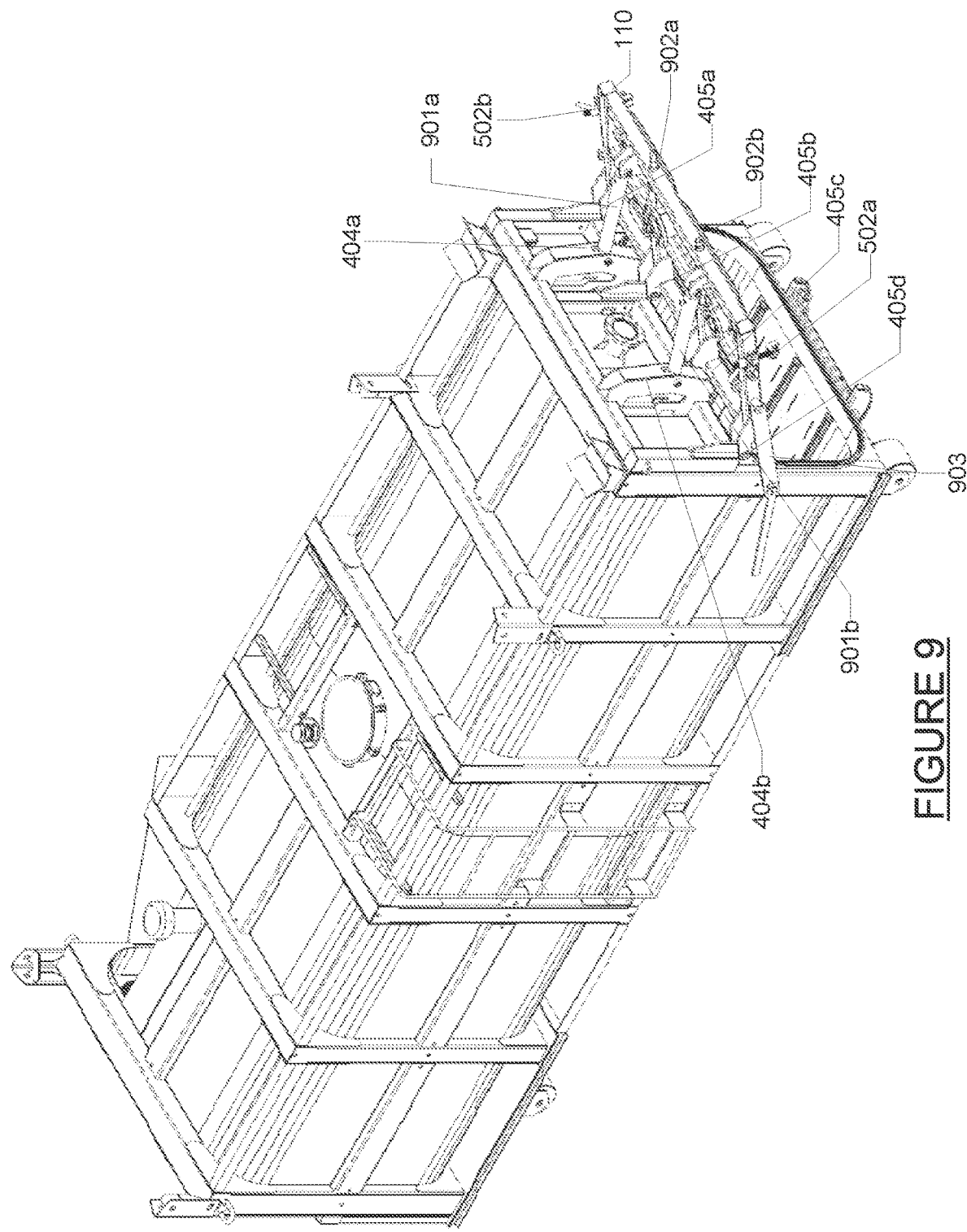
FIG. 9 is a perspective view of an exemplary set of warming tubes.

FIG. 9 is a perspective view of an exemplary slurry box 101 showing the tailgate 110 in the open position. The tailgate 110 may be opened using hydraulic force or any other force. In some embodiments at least one hydraulic cylinder 901 is used to open and close the tailgate 110. In the figure, two hydraulic cylinders are connected between the tailgate 110 and each hydraulic mount 404. The tailgate 110 is attached to the vacuum tank 102 by at least one tailgate hinge 405. The one or more hinges may be attached to the structure 103 or may be attached to the vacuum tank 102. The tailgate 110 closes such that it is attached to the vacuum tank 102 and fluidly seals the vacuum tank 102 when it is closed. In the exemplary embodiment a set of four hinges are shown which comprise the tailgate hinge 405. The tailgate hinge 405 is configured such that its axis is parallel to the bottom of the structure 103. The tailgate 110 pivots on the tailgate hinge 405 such that it opens vertically.

When the tailgate 110 is moved to the closed position such that the tailgate 110 fluidly seals the vacuum tank 102, the tailgate is secured against the vacuum tank 102. The tailgate 110 can be secured against the vacuum tank 102 using a latch receiver 501, manual latch 502, or any other method appreciated by a person with ordinary skill in the art. In FIG. 9 an alternative type of manual latch 502 is shown. A vertical latch 902 may be used to secure the tailgate 110. The vertical latch 902 in this embodiment is functioned by a hydraulic force. A safety brace 903 may be attached to the structure 103 to ensure the tailgate 110 is forcefully maintained in an open position such that the tailgate 110 may not close due to the force of gravity or due to hydraulic force from a hydraulic cylinder 901. The safety brace 903 is hingedly attached to the structure 103 or vacuum tank 102 and is configured such that the tailgate 110 may not close when the safety brace 903 is positioned against the tailgate 110.

Figure 10:
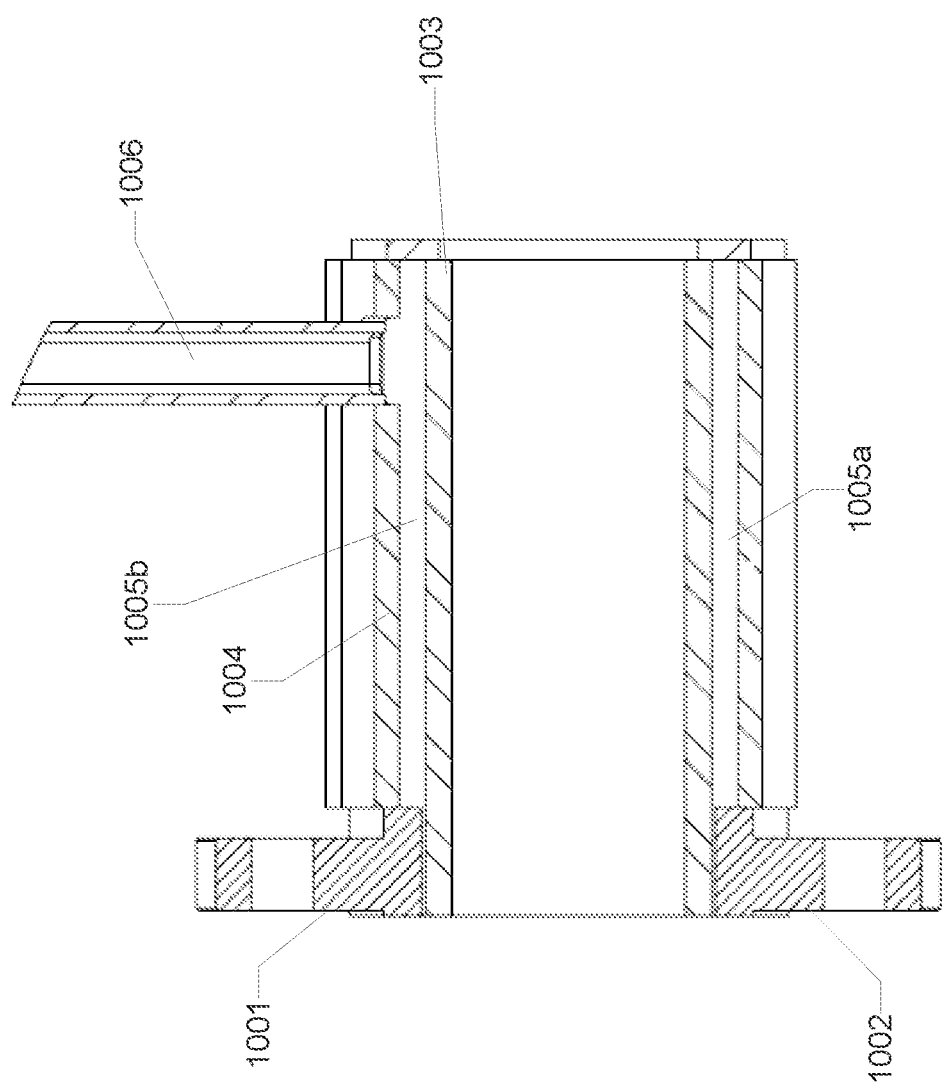
FIG. 10 is a 2D view of an exemplary jacketed flange 1001.

FIG. 10 is a 2D view of an exemplary jacketed flange 1001. The exemplary jacketed flange 1001 may be the front pipe flange 107, a rear pipe flange 403, or any other opening in the vacuum tank 102. The jacketed flange 1001 comprises of a flange face 1002, an inner surface 1003, an exterior surface 1004, and a warming channel 1005. Attached to the jacketed flange 1001 is a warming tube 1006. The warming tube 1006 conveys the heated fluid flow to the jacketed flange 1001 warming channel 1005. The heated fluid flow is fluid which was heated by the power unit 801. The warming tube 1006 may be connected from any angle or location. The heated fluid flow which is conveyed to the warming channel 1005 maintains a temperature which causes any material located within the area contained by the inner surface 1003 to remain above a freezing temperature. The inner surface 1003 is essentially encloses an opening which allows material to flow through. The exterior surface 1004 encloses the inner surface 1003.

Figure 11:
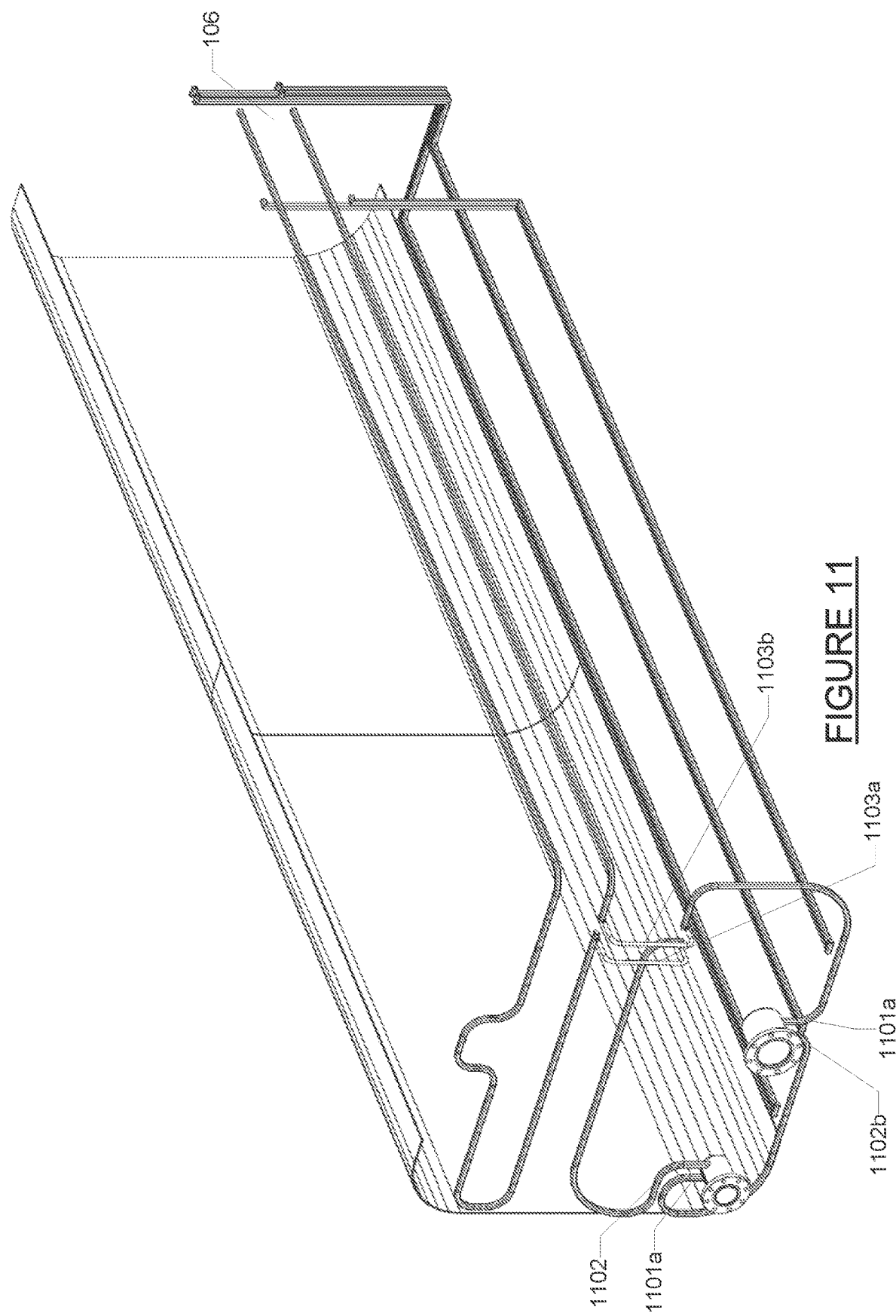
FIG. 11 is a perspective view of an exemplary set of warming tubes.

FIG. 11 is a perspective view of an exemplary set of warming tubes. The figure does not include all potential warming tubes which may be attached to the vacuum tank 102. Shown are two jacketed flanges which represent the location at which the tailgate 110 would be positioned when closed. The two shown flanges would be attached to the tailgate 110. A supply warming tube 1101 and an exit warming tube 1102 is attached to each of the jacketed flanges. Hinge warming tubes 1103 are used to connect warming tubes in the tailgate 110 to warming tubes attached to the vacuum tank 102. Warming tubes are configured to be positioned such to connect to connectors in the mechanical bay 106.

Figure 12:
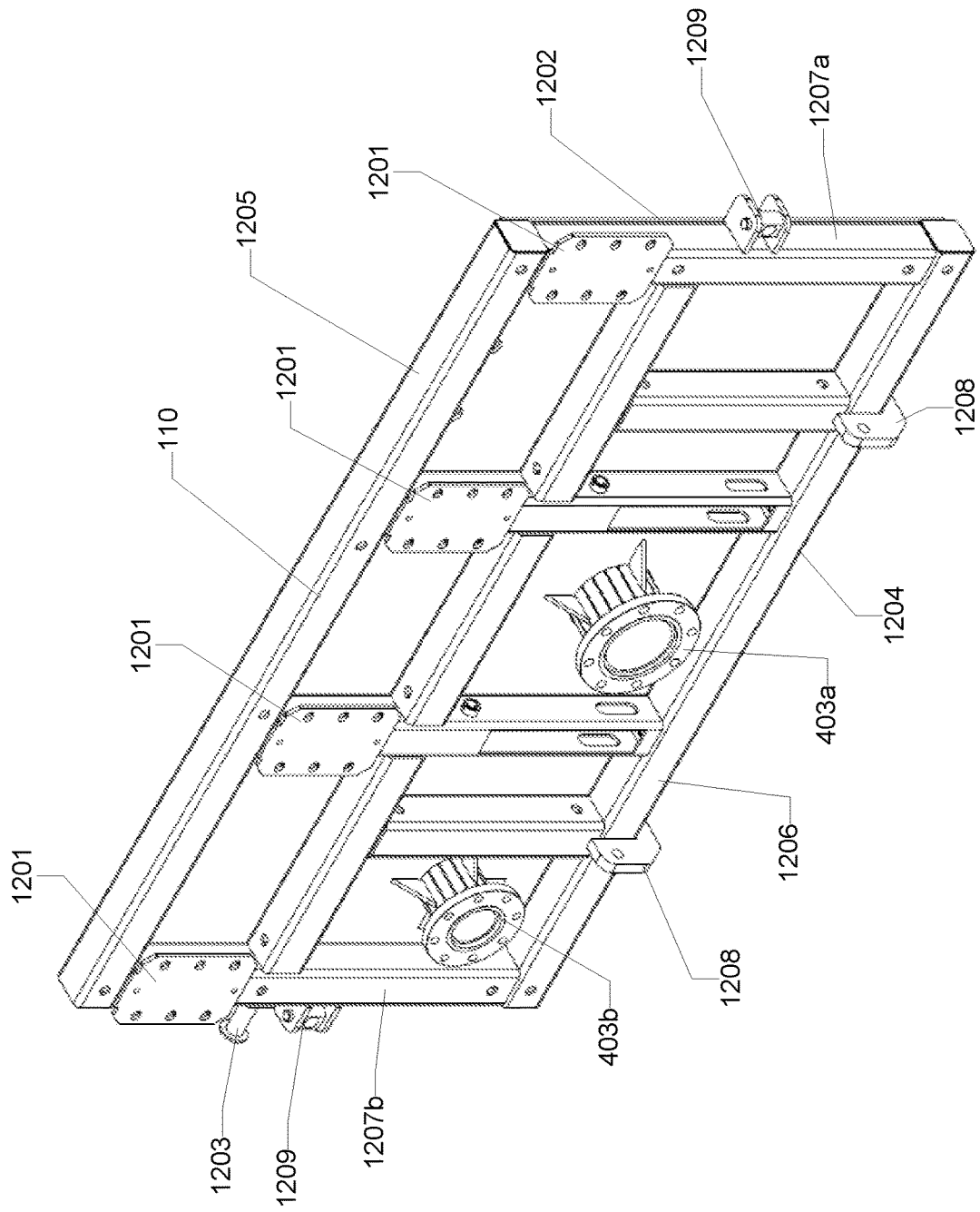
FIG. 12 is a perspective view of an exemplary tailgate.

FIG. 12 is a perspective view of an exemplary tailgate 110 shown not attached to the vacuum tank 102. The tailgate 110 as shown in FIG. 12 is on possible embodiment and may be configured in alternative embodiments. The tailgate 110 may be comprised of a tailgate assembly and a tailgate warming tube loop 1303. The tailgate assembly may be comprised of structural members and an interior surface 1202. The structural members may be metal square tubing attached together to create the shape of the tailgate 110. Structural members may be fastened together with fasteners, welded, or other devices. The interior surface 1202 is attached to the structural members.

The tailgate 110 may seal to the vacuum tank 102 such that a sealing material is located between the vacuum tank 102 and the tailgate 110. The sealing material may be an elastomer with viscoelasticity. For example, the sealing material may be natural or synthetic rubber. The sealing material fills any voids between the vacuum tank 102 and tailgate 110 such that a vacuum can be pulled in the vacuum tank 102 or such that the vacuum tank 102 may hold a positive pressure. The sealing material may be configured to attach to the tailgate 110 or the vacuum tank 102. For example, when the tailgate 110 opens, the sealing material may remain attached to the tailgate 110 and move away from the vacuum tank 102.

The tailgate 110 has a top 1205, a bottom 1206, a first side 1207a, and a second side 1207b. The first side 1207a and the second side 1207b may be referenced as a side or the sides. The tailgate 110 has a perimeter 1204. The perimeter 1204 is defined by the top 1205, the bottom 1206, the first side 1207a, and the second side 1207b. The sealing material may match the shape of the perimeter 1204. The tailgate 110 as shown in FIG. 12 is rectangular, though the tailgate 110 may be configured in any shape that conforms to the vacuum tank 102.

The tailgate 110 may be further comprised of openings. The openings may include jacketed openings. The jacketed openings may include one or more rear flanges. There may be a first rear flange 403a and a second rear flange 403b. Other openings may be configured through the tailgate 110. The first rear flange 403a and the second rear flange 403b may be attached to the tailgate assembly or the interior surface 1202. The first rear flange 403a and the second rear flange 403b extend through the interior surface 1202 such that material may pass through first rear flange 403a or the second rear flange 403b into or out of the vacuum tank 102.

The tailgate 110 may have a hinge mount 1201. There may be one or more hinge mounts. Alternatively, the tailgate 110 may be configured without any hinge mount 1201 and each tailgate hinge 405 may be attached to the perimeter 1204 or other tubing comprising the tailgate 110. A tailgate hinge 405 may be secured to a hinge mount 1201 by fasteners, welding, or other relevant methods. The tailgate 110 may be attached to the vacuum tank 102 by at least one tailgate hinge 405. One portion of the tailgate hinge 405 may be attached to the tailgate 110 hinge mount 1201 whereas another portion of the tailgate hinge 405 may be attached to the vacuum tank 102; the hinged function occurring between the two portions to allow the tailgate 110 to open and close.

The tailgate 110 may be further comprised of one or more hydraulic point 1208. The hydraulic point 1208 is a point on the tailgate 110 at which the hydraulic cylinder 901 may be connected to the tailgate 110. The hydraulic point 1208 may extend from the tailgate 110 to allow for clearance between the tailgate 110 and the hydraulic cylinder 901. More than one hydraulic cylinder 901, hydraulic point 1208, and hydraulic mount 404 may be configured on the slurry box 101.

The tailgate 110 may be further comprised of one or more manual latch bases. A manual latch 502 is comprised of a manual latch base 1209 and a manual latch hook. The manual latch base 1209 may be configured to attach to one or both sides of the tailgate 110. A manual latch hook may be attached to the manual latch base 1209 which extends toward the structure 103. An exemplary manual latch hook may be a threaded rod which has a wing nut on a first end or the threaded rod and a hook on the second end of the threaded rod. The hook may secure to the structure 103 or vacuum tank 102 when the wing nut is tightened. When the hook is secured to the structure 103 or vacuum tank 102, the tailgate 110 may be effectively securely closed. The wingnut in the example, may be removed by an operator. The tailgate 110 can be secured against the vacuum tank 102 using a latch receiver 501, manual latch 502, or other device.

The slurry box 101 may be configured with a safety system to ensure the tailgate 110 may not close due to gravity, hydraulic force, or other force once opened. This safety system may ensure that a worker isn't accidentally injured by a closing tailgate 110 or trapped in the vacuum tank 102. The safety system may comprise of a safety brace 903 and a safety stop 1203. The safety brace 903 is hingedly attached to the structure 103 or vacuum tank 102 and is configured such that the tailgate 110 may not close when the safety brace 903 is positioned against the tailgate 110. The point on the tailgate 110 upon which the safety brace 903 is positioned against may be the safety stop 1203. The safety stop 1203 may be connected to the perimeter of the tailgate 110.

Figure 13:
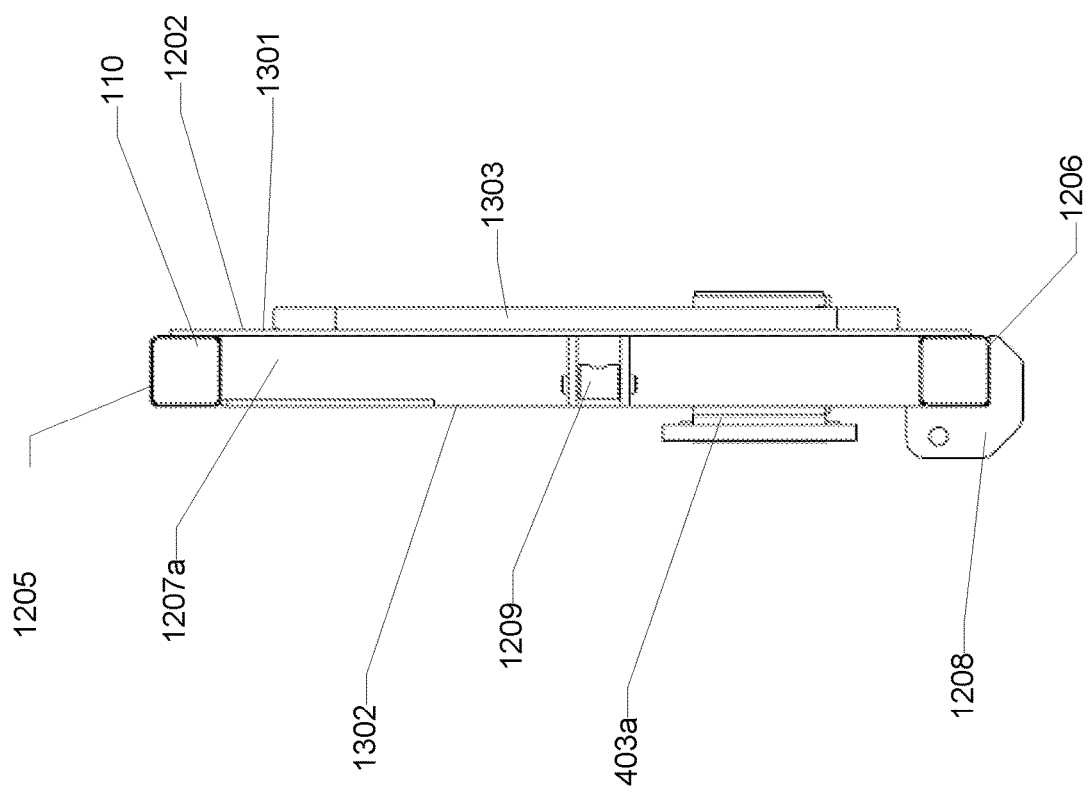
FIG. 13 is a 2D view of an exemplary tailgate from a side perspective.

FIG. 13 is a 2D view of an exemplary tailgate 110 from a side perspective. The tailgate 110 and interior surface 1202 has an interior side 1301 and an exterior side 1302. The interior side 1301 is the portion of the tailgate 110 that is exposed to the interior of the vacuum tank 102 when the tailgate 110 is closed. The exterior side 1302 is the side of the tailgate 110 that is exposed to the atmosphere when the tailgate 110 is closed. Attached on the interior side 1301 may be a tailgate warming tube loop 1303. The tailgate warming tube loop 1303 may extend from the interior side 1301 to the exterior side 1302 in order to connect with hinge warming tubes 1103.

Figure 14:
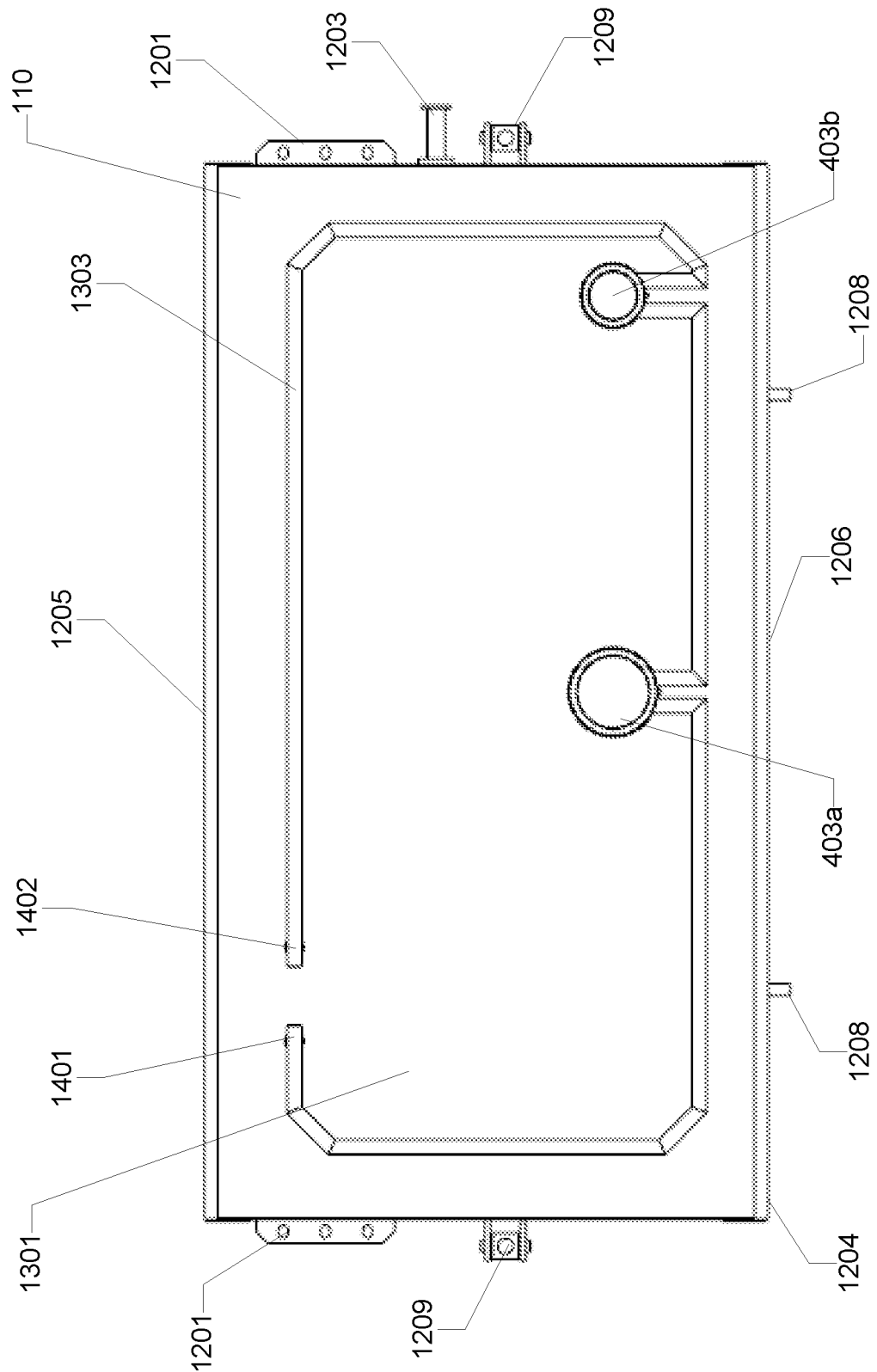
FIG. 14 is a 2D view of an exemplary tailgate from an inside perspective.

FIG. 14 is a 2D view of an exemplary tailgate 110 from an inside perspective. The interior side 1301 is shown in the figure. The figure demonstrates the perimeter 1204 as defined by the top 1205, the bottom 1206, the first side 1207a, and the second side 1207b. A tailgate warming tube loop 1303 shape generally follows the shape formed by the perimeter 1204. The tailgate warming tube loop 1303 may be offset from the perimeter 1204. Heated heating fluid, in the form of a heated flow, may enter the tailgate warming tube loop 1303 at the entrance 1401, flow through the tailgate warming tube loop 1303, the jacketed flanges, and exits the tailgate warming tube loop 1303 through the exit 1402. The exit 1402 and entrance 1401 may be reversed. The tailgate warming tube loop 1303 may be connected to one or more jacketed flanges.

Explanation of Exemplary Language

While various inventive aspects, concepts and features of the general inventive concepts are described and illustrated herein in the context of various exemplary embodiments, these various aspects, concepts and features may be used in many alternative embodiments, either individually or in various combinations and sub-combinations thereof.

Unless expressly excluded herein all such combinations and sub-combinations are intended to be within the scope of the general inventive concepts. Still further, while various alternative embodiments as to the various aspects, concepts and features of the inventions (such as alternative materials, structures, configurations, methods, devices and components, alternatives as to form, fit and function, and so on) may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the general inventive concepts even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed is:

1. A transportable slurry box for transporting a cuttings slurry in cold weather climates without the cuttings slurry freezing, the transportable slurry box comprising:
    a door movably mounted to the slurry box, the door movable between an open position and a closed position to provide access to an interior of the slurry box to contain a cuttings slurry, wherein the slurry box comprises a rectangular cuboid shape constructed from a steel with a ductile brittle transition temperature less than −50 degrees Celsius;
    a heating unit mounted to the slurry box, the heating unit operable to heat a fluid producing a heated fluid flow; and
    a first heat loop fluidly connected to the heating unit, the first heat loop circulates the heated fluid flow to heat the cuttings slurry.

2. The transportable slurry box as recited in claim 1, wherein the open position permits a cuttings slurry to be received into the slurry box.

3. The transportable slurry box as recited in claim 1, wherein the first heat loop is attached to the interior surface of the slurry box.

4. The transportable slurry box as recited in claim 1, wherein the slurry box is a rectangular cuboid shaped structure.

5. The transportable slurry box as recited in claim 4, further comprising a wheel set attached to the slurry box to facilitate roll-on-roll-off operations from a vehicle.

6. A transportable slurry box for transporting a cuttings slurry in cold weather climates without the cuttings slurry freezing, the transportable slurry box comprising:
    a door movably mounted to the slurry box, the door movable between an open position and a closed position to provide access to an interior of the slurry box to contain a cuttings slurry, wherein the slurry box comprises a rectangular cuboid shape constructed from a steel with a ductile brittle transition temperature less than −50 degrees Celcius;
    a heating unit mounted to the slurry box, the heating unit operable to heat a fluid producing a heated fluid flow;
    a first heat loop fluidly connected to the heating unit, the first heat loop circulates the heated fluid flow to heat the cuttings slurry; and
    a second heat loop fluidly connected to the heating unit, the second heat loop attached to the door of the slurry box, the second heat loop circulates the heated fluid flow to heat the door.

7. The transportable slurry box as recited in claim 6, wherein the heating unit is removably mounted within a mechanical bay of the slurry box.

8. The transportable slurry box as recited in claim 6, further comprising a wheel set attached to the slurry box to facilitate roll-on-roll-off operations from a vehicle.

9. The transportable slurry box as recited in claim 8, further comprising:
    a stacking mount system and a stacking leg system, the stacking mount system and the stacking leg system fit together to allow multiple slurry boxes to be stacked vertically.

10. A transportable slurry box for transporting a cuttings slurry in cold weather climates without the cuttings slurry freezing, the transportable slurry box comprising:
    a door movably mounted to the slurry box, the door movable between an open position and a closed position to provide access to an interior of the slurry box to contain a cuttings slurry;
    a heating unit mounted to the slurry box, the heating unit operable to heat a fluid producing a heated fluid flow, wherein the heating unit is removably mounted within a mechanical bay of the slurry box; and
    a first heat loop fluidly connected to the heating unit, the first heat loop circulates the heated fluid flow to heat the cuttings slurry.

11. A transportable slurry box for transporting a cuttings slurry in cold weather climates without the cuttings slurry freezing, the transportable slurry box comprising:
    a door movably mounted to the slurry box, the door movable between an open position and a closed position to provide access to an interior of the slurry box to contain a cuttings slurry;
    a heating unit mounted to the slurry box, the heating unit operable to heat a fluid producing a heated fluid flow;

a first heat loop fluidly connected to the heating unit, the first heat loop circulates the heated fluid flow to heat the cuttings slurry, and a second heat loop fluidly connected to the heating unit, the second heat loop attached to the door of the slurry box, the second heat loop circulates the heated fluid flow to heat the door.

\* \* \* \* \*